United States Patent [19]

Patzschke

[11] 4,209,598

[45] Jun. 24, 1980

[54] MODIFIED, WATER-DILUTABLE POLYMER OIL IMIDES CONTAINING CARBOXYL GROUPS

[75] Inventor: Hans-Peter Patzschke, Wuppertal, Fed. Rep. of Germany

[73] Assignee: Dr. Kurt Herberts & Co. Gesellschaft mit beschrankter Haftung Vorm. Otto Louis Herberts, Wuppertal, Fed. Rep. of Germany

[21] Appl. No.: 899,853

[22] Filed: Apr. 25, 1978

Related U.S. Application Data

[60] Continuation-in-part of Ser. No. 797,380, May 16, 1977, abandoned, which is a division of Ser. No. 636,368, Dec. 1, 1975, Pat. No. 4,051,198.

[51] Int. Cl.² ............................................. C08F 8/30
[52] U.S. Cl. ................................. 525/333; 106/285; 106/901; 204/181 C; 526/262; 526/317; 526/324; 525/334; 525/374; 525/378; 525/379; 525/380; 525/381; 525/382
[58] Field of Search ............. 526/52.1, 52.2, 52.3, 526/52.4, 52.5, 49, 20, 21, 262, 324; 106/285, 901; 204/181 C; 260/879, 887

[56] References Cited

U.S. PATENT DOCUMENTS

| | | | |
|---|---|---|---|
| 3,337,517 | 8/1967 | Anspon | 526/49 |
| 3,483,125 | 12/1969 | Clough | 526/51.5 |
| 3,546,184 | 12/1970 | Heidel et al. | 260/78.4 |
| 3,684,777 | 8/1972 | Field | 526/49 X |
| 3,714,045 | 1/1973 | Fraugotos | 526/49 X |
| 3,778,418 | 12/1973 | Nakayama | 526/49 X |
| 3,840,499 | 10/1974 | Di Giulio | 526/262 |
| 4,051,198 | 9/1977 | Patzschke | 260/879 |

FOREIGN PATENT DOCUMENTS

| | | |
|---|---|---|
| 1219684 | 6/1966 | Fed. Rep. of Germany . |
| 2300108 | 3/1976 | France . |
| 771584 | 4/1957 | United Kingdom . |
| 1102652 | 2/1968 | United Kingdom . |
| 1204730 | 9/1970 | United Kingdom . |

OTHER PUBLICATIONS

Nucleophilic Substitution; p. 362.

*Primary Examiner*—William F. Hamrock
*Attorney, Agent, or Firm*—Schwartz, Jeffery, Schwaab, Mack, Blumenthal & Koch

[57] ABSTRACT

Disclosed are modified, water-dilutable polymer oil imides containing carboxyl groups, methods for producing same and coating compositions, preferably electro-dip-lacquering compositions, containing same.

2 Claims, No Drawings

MODIFIED, WATER-DILUTABLE POLYMER OIL IMIDES CONTAINING CARBOXYL GROUPS

REFERENCE TO RELATED APPLICATIONS

This application is a continuation-in-part of application Ser. No. 797,380, filed May 16, 1977, now abandoned, which in turn is a divisional application of Ser. No. 636,368, filed Dec. 1, 1975, now U.S. Pat. No. 4,051,198.

BACKGROUND OF THE INVENTION

This invention relates to modified, water-dilutable polymer oil imides containing carboxyl groups.

The invention also relates to a process for producing the aforementioned polymer oil imides and to coating co-positions, especially for electro-dip-lacquering, which contain these polymer oil imides as a binder. These aqueous coating compositions are prepared by neutralising the aforementioned modified polymer oil imides with a base, followed by gradual dilution with more water, optionally in conjunction with other solvents.

The increasing demands of industry on electro-diplacquers in regard to their service properties, coupled with increasing efforts to control pollution, are leading in the lacquer industry to developments which improve coverage and protection against corrosion by using resin systems which, when stoved, give off very little solvent or other pollutants into the atmosphere. Modified, water-dilutable olefin polymer oils containing carboxyl groups are already known, such as those produced by reacting $\alpha,\beta$-unsaturated dicarboxylic acids or their anhydrides, more especially maleic acid anhydride, optionally in admixture with $\alpha,\beta$-unsaturated monocarboxylic acids, and/or (semi) esters and/or (semi) amides of these acids with olefin polymer oils substantially free from carboxyl groups (German Auslegeschrift (DAS) No. 1,929,593). On the other hand, it is known that maleinate oils can be partially converted into imides and the resulting products stoved in combination with phenol-formaldehyde or melamine resin (German Offenlegungsschrift (DOS) No. 1,494,453). On account of their high viscosity, these products are difficult to process by electrophoresis and, when stoved, pollute the surrounding atmosphere to a very considerable extent. In cases where non-phosphatised metal sheets are used, totally unsatisfactory ASTM-results are obtained after 144 hours. The results reported in Table 2 of DOS No. 1,494,453 relate to the use of phosphatised metal sheets. On the other hand, it is know that the aforementioned olefin polymer oils, more especially maleinised butadiene oils, can be used in conjunction with phenolresole carboxylic acids (DAS No. 1,929,593) in order to improve protection against corrosion. However, these products can only be deposited at very low voltages and are extremely sensitive to temperature in their deposition behavior. Use of phenol-formaldehyde resins also endangers the environment to a considerable extent by polluting the effluents during production (phenols, inorganic salts) and the atmosphere during stoving of the films (liberation of formaldehyde).

SUMMARY OF THE INVENTION

The object of the present invention is to provide modified, water-dilutable polymer oil imides containing carboxyl groups which can be deposited at high voltages and at relatively high temperatures while at the same time affording effective protection against corrosion.

Accordingly, the present invention accomplishes the foregoing objects by providing modified, water-dilutable polymer oil imides containing carboxyl groups, obtained by reacting $\alpha,\beta$-unsaturated dicarboxylic acids or their anhydrides, more especially maleic acid anhydride, optionally in admixture with $\alpha,\beta$-unsaturated monocarboxylic acids, and/or (semi) esters and/or (semi) amides of these acids with olefin polymer oils substantially free from carboxyl groups, distinguished by the fact that they are produced using $\alpha,\beta$-unsaturated dicarboxylic acid imides as a starting material and/or by introducing imide groups into the reaction product in such quantities that the polymer oil imides contain per gram of resin from about 2.0 to 3.5 milliequivalents, more especially from about 2.4 to 3.0 milliequivalents of carboxyl groups and from about 0.3 to 2.0 milliequivalents, more especially from about 0.6 to 1.4 milliequivalents of imide groups, wherein from about 10 to 40 milliequivalents and preferably from about 20 to 30 milliequivalents out of 100 milliequivalents of the total of milliequivalents of carboxyl groups and of imide groups are imide groups. The particularly preferred lower and upper limit values mentioned above may be arbitrarily combined with one another.

The invention also relates to a process for the production of modified, water-dilutable polymer oil imides containing carboxyl groups by reacting $\alpha,\beta$-unsaturated dicarboxylic acids or their anhydrides, more espectially maleic acid anhydride, optionally in admixture with $\alpha,\beta$-unsaturated monocarboxylic acids, and/or (semi) esters and/or (semi) amides of these acids with olefin polymer oils substantially free from carboxyl groups, distinguished by the fact that (a) at least partially $\alpha,\beta$-unsaturated dicarboxylic acid imides are used as starting products, and/or (b) the carboxyl-group-containing reaction products of acids and olefin polymer oils are reacted with imide-forming substances, the quantities in which the starting materials are used being selected in such a way that the polymer oil imides contain per gram of resin from about 2.0 to 3.5 milliequivalents, more especially from about 2.4 to 3.0 milliequivalents of carboxyl groups, and from about 0.3 to 2.0 milliequivalents, more especially from about 0.6 to 1.4 milliequivalents of imide groups, wherein from about 10 to 40 milliequivalents, preferably from about 20 to 30 milliequivalents out of 100 milliequivalents of the total of milliequivalents of carboxyl groups and of imide groups are imide groups.

The present invention also relates to an aqueous coating composition, especially for electro-dip-lacquering, containing a binder dilutable with water by neutralization with a base and, optionally, organic solvents, distinguished by the fact that it contains as the binder one or more modified, water-dilutable polymer oil imides containing carboxyl groups according to the foregoing definition and, optionally, other compatible synthetic resins.

The average molecular weight of the olefin polymer oils substantially free from carboxyl groups which are used as starting products is between about 500 and 2500 and preferably between about 1000 and 2000. The viscosity of the polymer oil imide obtained as end product advantageously amounts to between about 300 and 1500 m Pas and preferably to between about 500 and 1200 m Pas, as measured on a 50% solution (weight/weight) in butyl glycol at 25° C.

Imide formation is best carried out by reacting ammonia or urea or a compound which forms ammonia under reaction conditions such as ammonium carbonate with the reaction product of α,β-unsaturated dicarboxylic acids or their anhydrides, optionally in admixture with α,β-unsaturated monocarboxylic acids, and/or (semi) esters and/or (semi) amides of these acids with olefin polymer oils substantially free from carboxyl groups.

Other objects, features and advantages of the invention will become apparent from the description of preferred embodiments which follows.

DESCRIPTION OF PREFERRED EMBODIMENTS

It has surprisingly been found that, even on untreated metal substrates, it is possible to obtain good, reproducible anti-corrosion results with electrically deposited maleinised butadiene oils in which some of the anhydride groups have been converted into imide groups. This is particularly surprising because, according to the prior art discussed above (DOS No. 1,494,453), the introduction of imide groups into maleate oils does not have the effect that useful anti-corrosion results are obtained, even on untreated metal substrates, by electrophoretic deposition at high deposition voltages. According to the invention, smoothly levelling films are obtained which can be deposited under high deposition voltages, whereby the coverage of the lacquer system is improved. In cases where combination products of maleinised butadiene oils and phenolresole carboxylic acids according to the prior art are used, the deposition temperatures have to be strictly controlled. If the bath temperature exceeds about 20° to 25° C., smooth films are no longer obtained. Accordingly, extremely elaborate cooling systems are required for keeping the temperature of the deposition bath at a sufficiently low level. In cases where the polymer oil imide according to the invention is used, the deposition bath can have considerably higher temperatures, for example of up to about 30° to 35° C. and, in certain cases, even higher, and additionally, high deposition voltages can be applied. The polymer oil imides according to the invention have the further advantage that no molecule reductions can be caused by hydrolysis reactions.

After stoving, the polymer oil imides give films which are highly resistant to corrosion by salt mists and industrial atmospheres. One particular advantage of these coatings is that they afford effective protection against corrosion even for non-pretreated iron surfaces. By virtue of this factor, imperfections in the quality of the metal substrates and in the pretreatment (cleaning, phosphatising) are more effectively covered by the stoved lacquer films, which is a considerable advantage to industry.

The olefin polymer oil used as starting material according to the invention preferably comprises at least about 40% by weight of 1,4-polybutadien oil.

The production of maleinised olefin polymer oils from maleic acid anhydride and unsaturated polyhydrocarbons is known per se and is best carried out as follows:

Suitable polymers of dienes are produced from 1,3-butadiene and/or isoprene and/or 2,3-dimethyl-1,3-butadiene and/or chloroprene, optionally with other copolymerisable monomers, such as styrene, α-methyl styrene, (meth) acrylonitrile, (meth) acrylic acid esters, vinyl esters, vinyl ethers, vinyl ethers, vinyl ketones. The polymers contain predominantly isolated double bonds which optionally may be partially hydrogenated. The configuration of the oil polymers (1,4-cis, 1,4-trans or 1,2-vinyl) may vary according to the polymerisation conditions applied (temperature, catalyst, pressure). The choice of the diene polymer is normally governed by the required mechanical and electrical properties which the finished coating is intended to show. It is preferred to use 1,4-cis-polybutadiene oil, which is generally considered as a polymer having more than about 40% cis-1,4 units. The chain ends may contain carboxyl groups emanating from chain terminators. The olefin polymer oil may be mixed with up to 20% by weight of cyclopentadiene resin, coumarone-indene resin, degraded rubber or cyclized rubber before maleinisation.

Maleinised olefin polymer oils suitable for the purposes of the invention have a maleic acid anhydride content of about 15 to 30% by weight, preferably from about 20 to 26% by weight.

Reaction of the butadiene oil with maleic acid anhydride is carried out in the presence of solvents and inhibitors in order to prevent gelation of the product and to keep the viscosity as low as possible. Solvent is added in such a quantity that a resin solids content of from 85 to 97% by weight, preferably 90 to 95% by weight, is obtained. The choice of the solvent is determined by the following considerations:

1. It should not react with the individual resin components through its functional groups.
2. Solvents with relatively high transfer constants give products of relatively low viscosity.
3. The boiling point of the mixture as a whole should be such that a reaction of the maleic acid anhydride with the unsaturated double bonds is still possible in the mixture.
4. The solvent should be removable by distillation on completion of the addition reaction; any residues left should not give rise to any faults, such as craters, during lacquering.
5. It must be readily compatible with the maleinised butadiene oil and its modifications.

Examples of suitable solvents are aromatic hydrocarbons, such as toluene, xylene, ethyl benzene or cumene, lower aliphatic e.g. alkyl ketones such as methylisobutyl ketone or cyclohexanone, lower alkyl esters of lower fatty acids such as isoamyl acetate, and the like. It is preferred to use commercial-grade xylene.

The quantity in which the solvent is added is governed by the boiling point of the solvent, by the retention capacity of the resin, by the filling level of the reaction vessel and by the reaction temperature selected. Depending upon the reaction temperature, resins with substantially the following solids contents can be prepared with xylene:

| Reaction Temperature | Solids Content |
| --- | --- |
| 200° C. | 92% by weight |
| 220° C. | 94% by weight |
| 240° C. | 96% by weight |

For the same temperature, a thinner resin is obtained with a lower solids content.

Suitable inhibitors are aryl amines such as diphenyl amine, naphthyl amine or p-phenylene diamine derivatives and/or sterically hindered phenols, such as 2,6-ditert.-butyl-4-methyl phenol or 2,4-dimethyl-6-tert.-butyl phenol and/or phenothiazine and/or quinoline derivatives, used in quantities of from 0.01 to 2.0% by weight. Although the tendency towards gelation is most effectively suppressed with amine-based inhibitors, the reaction products obtained are darker than those obtained with phenols. Copper compounds give unusable products.

The reaction temperature is in the range from about 180° to 260° C. and preferably in the range from about 190° to 200° C. The reaction is carried out in an inert gas atmosphere, such as nitrogen.

The polymer oil imides are preferably obtained by reacting the anhydride-containing polymer oils with ammonia, compounds which give off ammonia under the reaction conditions, primary amines or amides, preferably by reaction with urea or mono-substituted ureas. The monoamides initially formed are thermally decomposed at temperatures above 80° C. and more especially at temperatures above 120° C. until no more carbon dioxide is given off. This reaction is best carried out in the presence of solvents such as xylene, ketones, dimethyl formamide, relatively high, e.g. 100°–140° C. boiling petrols or, optionally, chlorinated hydrocarbons e.g. tri- or tetrachloroethylene or chlorobenzene. In order to complete the reaction after the initially vigorous evolution of $CO_2$ has abated, the reaction temperature may be increased up to 250° C. The water of reaction formed is distilled off with the solvent, optionally in vacuo. The reaction with urea is controlled in such a way that the end product has an acid number of from about 100 to 250, more especially from about 150 to 200. The acid number of the maleinised butadiene oil is reduced by imide formation by at least about 30 units and more especially by at least about 50 units.

In the context of the invention, 5-membered imide groups are those corresponding to the following formula

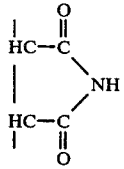

I these groups being incorporated into the polymer oil imide molecule through at least one free carbon bond. The other free valency may also be incorporated into the polymer oil imide molecule or saturated by hydrogen.

In the context of the invention, one milliequivalent is the equivalent weight of the particular group in milligrams. For example, the equivalent weight of the carboxyl group is approximately 45 g. If, therefore, 45 mg of carboxyl groups are present in 1 g of resin, 1 g of resin contains 1 milliequivalent of carboxyl groups. In the context of the invention, the expression "carboxyl groups" also includes acid anhydride groups, for example of maleic acid, in the sense that 1 equivalent of acid anhydride group counts as 2 equivalents of carboxyl groups.

The water-dilutable binders are produced in the usual way by neutralization with bases and distilled or deionised water, optionally in conjunction with suitable co-solvents. It is important to ensure that dilution to a relatively low solids content is carried out gradually so as to avoid non-dissolvable coagulates or precipitation phenomena during ageing. The individual dilution stages are largely determined by the concentrated acid refill material and by the mixing in of the concentrate in the premixing vessel on the continuously operated coating tank.

In the practical application of the coating compositions according to the invention, a tank in which coating is carried out is initially filled with the adequately diluted coating compositions. In view of the consumption of binder during the operation of this tank, the tank has to be refilled with a binder concentrate. This binder concentrate for the refill material may be prepared for example in two ways:

1. By prehydrolysing the residual anhydride groups by adding water in a slight stoichiometric excess at temperatures in the range from about 80° to 120° C., optionally under pressure, and subsequently adding alcoholic or glycolic solvents to a solids content of from about 70 to 90% by weight;

2. By prehydrolysis with water as in (1), accompanied or followed by addition of the quantity of base required for the acid refill material. Further dilution with water to a solids content of from about 60 to 80% by weight is carried out by dividing the total quantity of water substantially into portions which correspond to an increasing geometric series.

Organic solvents, antioxidants and any other additives required, such as crosslinking aids, are added in the last stage or during pigmenting. These agents are conventional.

The baths are stabilised against ageing by the addition of phenolic inhibitors such as, for example, hydroquinone, 2,6-di-tert.-butyl-4-methyl phenol, 2,4-dimethyl-6-tert.-butyl phenol, or by the addition of aromatic amines such as phenyl naphthylamine, diphenyl amine or p-phenylene diamine derivatives. The advantages of the amine-based inhibitors is that they are only co-deposited on the anode to a limited extent and, as a result, do not interfere with drying of the film.

Bases suitable for neutralising the products according to the invention are, in addition to ammonia, primary, secondary or tertiary alkyl amines, preferably lower alkyl amines, for example diethyl amine, triethyl amine, morpholine, also alkanolamines such as diisopropanolamine, triethanolamine, 2-dimethyl amino-2-methyl propanol, dimethylamino ethanol or, in small quantities, even alkylene polyamines such as ethylene diamine or diethylene triamine and, optionally, even quarternary ammonium hydroxides such as, for example, triethyl benzyl ammonium hydroxide. The amine neutralising agent influences the mechanical stability of the aqueous dispersion. Volatile nitrogen bases, such as ammonia or triethyl amine, are preferred although it is also possible to use non-volatile bases such as, for example, lithium, sodium and potassium in the form of hydroxides or alkali salts, for example carbonates. In general, as much base is added as the polymer oil imide containing carboxyl groups needs to dissolve in water. The base is preferably used in a stoichiometric deficit, i.e. 0.5 to 1.0 equivalent of amine, based on equivalents of carboxyl groups because excessively large quantities of amine produce surface irregularities. The pH-value of the neutralised dispersion should amount to between about 6.8 and 7.3 for a solids content of from about 10 to 15%. The viscosity of the dispersion increases with decreasing pH-value and decreases with increasing pH-value.

In order to promote dilutability with water, to make the concentrated resins easier to handle and to stabilise the emulsions, the coating compositions according to the invention may also contain co-solvents. Solvents that are infinitely miscible with water are used in relatively large quantities for reducing viscosity. Examples of such solvents are alcohols such as methanol, isopropanol or sec.-butanol, the semi ethers of glycols, such as ethylene glycol monoethyl ether or ethylene glycol monobutyl ether, or keto alcohols such as diacetone alcohol.

The viscosity anomaly in the form of a "water mountain" which often occurs during dilution may be influenced particularly favorably by the addition of solvents with limited solubility in water such as n-butanol, amyl alcohol, isophorone or methylisobutyl ketone, which has a particularly positive effect upon the dilutability of the resins. In many cases, it is possible by adding small quantities e.g. up to 2% v/v of the bath of aromatic e.g. toluene, xylene and aliphatic e.g. $C_6$–$C_{10}$ hydrocarbons of various different chain lengths more effectively to disperse the water-insoluble resin constituents in the aqueous phase, to increase their stability and to improve the fluidity of the deposited film.

In order to promote crosslinking of the film, it is often of advantage to add to the emulsions siccatives such as, for example, resinates or octoates of iron, manganese, cobalt and, optionally, radical formers such as, for example, peroxides, hydroperoxides or peresters with different decomposition temperatures or even vulcanisation accelerators.

The following Examples illustrate the production of the resin mixtures according to the invention and their electro-phoretic deposition. However, the invention is not limited to these Examples and may be varied by numerous modifications. Thus, maleinate resins, colophony esters, styrene-allyl alcohol copolymers and their esters, Epikote esters, (meth) acrylic acid ester copolymers, ketone- and phenol-, melamine-, urea-formaldehyde resins, oil-free polyesters and alkyd resins, and also polyvinyl ethers, may be additionally incorporated into the emulsion to a limited extent, in order to modify service properties, the limit to "chargeability" being considerably increased by an increased acid number of the base resin or by avoiding a precipitation shock during dilution with water.

EXAMPLE 1

1617 g of a 1,4-cis-polybutadiene oil with an average molecular weight of about 1500 are heated under nitrogen to a temperature of about 140° C. in a 4-liter flask with 250 g of commercial-grade xylene and 5 g of a standard commercial-grade anti-ager of the diarylamine type. Following the addition of 533 g of maleic acid anhydride, the mixture is heated to a temperature of 195° C. and kept at that temperature until no more free maleic acid anhydride can be detected. After cooling to 165°–170° C., 75 g of urea are scattered in very slowly in very small portions, vigorous foaming taking place through the elimination of carbon dioxide. When foaming abates, the temperature is increased to 190° C. and the mixture purged with a vigorous stream of nitrogen until no more carbon dioxide can be detected with baryta water. The solvent is then distilled off in vacuo. The following final values are measured:
Viscosity: 559 mPas (as measured on a 50% solution in butyl glycol at 25° C.).
Acid number: 152 (as measured with aqueous KOH).

1 g of resin contains 2.71 milliequivalents of carboxyl groups and 1.16 milliequivalents of imide groups. Accordingly, there are 23 milliequivalents of imide groups to 100 milliequivalents of the total of milliequivalents of carboxyl groups and milliequivalents of imide groups.
Refill concentrate:
1780 g of the resin obtained as described above are mixed successively with 80 g of distilled or deionised water and 225 g of a mixture of butyl glycol and sec.-butanol (1:1) and hydrolysed for 3 hours at 80° C.
Solids content: 85.6% by weight (as measured by heating for 40 minutes to 180° C. in a recirculating air drying cabinet).
Deposition bath: 233.6 g of the refill material are gradually diluted with 14.2 g of triethylamine and 1752 g of distilled water.
MEQ-value: 68 (=milliequivalents of amine per 100 g of solid resin).
Solids: 10.1% by weight (as measured by heating for 15 minutes to 185° C. in a recirculating air drying cabinet).

The diluted bath is stirred for 24 hours. The deposition voltage on Bonder 127 plates amounts to 340 volts for a dry film thickness of 25μ. The film deposited in 2 minutes at 30° C. is stoved for 30 minutes at 175° C. after flushing with water. Testing of non-bonderised, degreased sheet metal by the salt spray test (according to ASTM B 117-61) shows below-surface rusting in the 1–1.5 mm section after a period of 144 hours.

EXAMPLE 2

The procedure is as in Example 1 except that the following quantities of material are used:
1300 g of 1,4-cis-polybutadiene oil (molecular weight about 1500)
500 g of 1,3-polypentadiene oil (molecular weight about 1000)
250 g of commercial-grade xylene
1.3 g of anti-ager
399 g of maleic acid anhydride
51 g of urea
Final values:
Viscosity: 631 mPas (50% solution in butyl glycol at 25° C.)
Acid number: 121 (as measured with aqueous KOH).
1 g of resin contains 2.16 milliequivalents of carboxyl groups and 0.77 milliequivalents of imide groups. Accordingly, there are 21 milliequivalents of imide groups to 100 milliequivalents of the sum of milliequivalents of carboxyl groups and milliequivalents of imide groups.
Refill concentrate: 1870 g of the resin obtained as described above are hydrolysed for 3 hours at 80° C. with 84 g of water and then are mixed with 236 g of butyl glycol/sec.-butanol (1:7).
Solids content: 85.3% by weight.
Deposition bath: 234.5 g of the refill material are gradually diluted with 10.1 g of triethylamine and 1755 g of distilled water.
MEQ-value: 47.
Solids content: 9.98% by weight. The deposition temperature was 30° C. and the deposition voltage 360 volts for a dry film thickness of 25μ.

EXAMPLE 3

3075 g of a 1,4-cis polybutadiene oil with an average molecular weight of about 1500 together with 450 g of commercial-grade xylene, 2.5 g of a standard commercial-grade antiager of the diaryl type were heated under nitrogen to a temperature of about 140° C. in a 6-liter flask. After the addition of 972 g of maleic acid anhydride, the mixture was heated to a temperature of 190° to 195° C. and kept at that temperature until no more free maleic acid anhydride could be detected. After the addition of 900 g of commercial-grade xylene, the mixture was cooled to 90°–95° C. and 65 g of gaseous ammonia introduced with the apparatus closed. After the end of the exothermic reaction, the mixture was slowly heated to 160°–170° C. with removal of water. When no more water was eliminated, the solvent was distilled off in vacuo. The following end values were obtained:

Viscosity: 440 mPa.s (measured on a 50% solution in butyl glycol at 25° C.).

Acid No: 163 (measured with aqueous KOH).

1 g of resin contains 2.91 mEquiv. of carboxyl groups and 0.94 mEquiv. of imide groups. For every 100 mEquiv. of the sum of mEquiv. of carboxyl groups and imide groups, there were 24 mEquiv. of imide groups.

Deposition bath: 200 g of the resin obtained as described above were successively diluted with 15 g of butyl glycol, 15 g of sec.-butanol, 20.2 g of triethylamine and 1950 g of distilled or de-ionized water and stirred for 24 hours in a closed vessel. The deposition voltage amount to 230 volts on Bonder 127-sheets for a dry film thickness of 25μ. The film deposited in 2 minutes at 30° C. was rinsed with water and then stoved for 30 minutes at 175° C. The surface was satisfactorily smooth.

EXAMPLE 4

The procedure was as in Example 3, but with the following quantities of material:
900 g of 1,4-cis polybutadiene oil (molecular weight approx. 1500)
900 g of polybutadiene oil with a molecular weight in the range from 1800 to 2000 (30% 1,4-cis, 40% 1,4-trans, 30% 1,2-vinyl groups)
220 g of commercial-grade xylene
2.7 g of antiager
485 g of maleic acid anhydride
45 g of gaseous ammonia End values:
Viscosity: 378 mPa.s (50% in butyl glycol).
Acid No.: 124 (measured with aqueous KOH).

1 g of resin contains 2.21 mEquiv. of carboxyl groups and 1.16 mEquiv. of imide groups. For every 100 milliequivalents of the sum of mEquiv. of carboxyl groups and imide groups, there were 34 mEquiv. of imide groups.

EXAMPLE 5

1641 g of a 1,4-polybutadiene oil with an average molecular weight (MN of about 900 (15–25% of 1,4-cis double bonds; 30–40% of 1,4-trans double bonds; and 40–50% of 1,2-vinyl groups) were heated under nitrogen to a temperature of about 140° C. in a 4-liter flask with 250 g of commercial-grade xylene and 1,25 g of a standard commercial-grade anti-ager of the diarylamine type. Following addition of 607 g of maleic acid anhydride, the mixture was heated to a temperature of 195° C. and kept at that temperature until no more free maleic acid anhydride can be detected. After cooling to 150° C., 74 g of urea per 2185 g of the maleinised butadiene oil were scattered in very slowly in small portions, vigorous foaming taking place during that addition. When foaming abates, the temperature was increased to 175° C. and the mixture purged with a vigorous stream of nitrogen until no more carbon dioxide could be detected with baryta water. The solvent was then distilled off in vacuo. The following final values were measured:

Viscosity: 405 mPas (as measured on a 50% solution in butyl glycol at 25° C.).

Acid number: 204 (as measured with aqueous KOH).

1 g of resin contains 3.14 milliequivalents of carboxyl groups and 1.10 milliequivalents of imide groups. Accordingly, there were 26 milliequivalents of imide groups per 100 milliequivalents of the sum total of milliequivalents of carboxyl and imide groups.

Refill concentrate: 1940 g of the resin obtained as described above were mixed with 85 g of distilled or deionised water, prehydrolysed for 3 hours at 80° C. and then mixed with a blend of 151 g of butyl glycol and 297 g of sec.-butanol.

Solids content: 79.5% by weight (as measured by heating for 40 minutes to 180° C. in a recirculating air drying cabinet).

Deposition bath: 251.6 g of the refill material were gradually diluted with 14.2 g of triethylamine and 1734 g of distilled water.

MEQ-value: 60 (=milliequivalents of amine per 100 g of solid resin).

Solids content: 10% by weight (as measured by heating for 15 minutes to 185° C. in a recirculating air drying cabinet).

The diluted bath was stirred for 24 hours and then used for electrophoretic deposition. The measuring results of this and Examples 6 and 7 are summarized in the Table attached at the end of the specification.

EXAMPLE 6

The procedure was as in Example 3 except that the following quantities of materials were used:
1800 g of a polybutadiene oil with an average molecular weight of about 2000 (20–30% of 1,4-cis double bonds; 40–50% of 1,4-trans double bonds; 20–30% of 1,2-vinyl groups)
220 g of commercial-grade xylene
2.7 g of anti-ager of the diarylamine type
485 g of maleic acid anhydride
Imidation was carried out by using 128 g of ammonium carbonate instead of urea.

Final values:
Viscosity: 347 mPas (50% solution in butyl glycol).
Acid number: 135 (as measures with aqueous KOH).
Refill concentrate:
1940 g of resin
86 g of water
151 g of butyl glycol
151 g of sec.-butanol
Solids content: 84.3% by weight.
Deposition bath: 237.2 g of the refill material were gradually diluted with 20.2 g of triethylamine and 1743 g of distilled water. MEQ-value: 88.
Solids content: 10% by weight.

EXAMPLE 7

The procedure was as in Example 3 except that the following quantities of materials are used:
5.92 kg of commercial-grade xylene
0.08 kg of anti-ager
49.28 kg of the 1,4-polybutadiene oil of Example 4
15.60 kg of maleic acid anhydride
8.00 kg of commercial-grade xylene
1.12 kg of liquid ammonia (100%).

After treatment with maleic acid anhydride, the resulting oil was cooled to 100° C. and diluted with 8 kg of commercial-grade xylene, whereupon at a temperature of 95° to 100° C. liquid ammonia was slowly pressed into the closed reactor. Pressure rose to about 2.5 atmospheres and diminished on completion of the ammonia addition. The temperature was then raised to 160° C. and water removed in form of an azeotrope. At the end of the reaction, the solvent was distilled off in vacuo.

Final values:

Viscosity: 520 mPas (50/50 solution in butyl glycol at 25° C.).

Acid number: 184 (as measured with aqueous KOH).

Refill concentrate:
  57.00 kg of resin.
  1.53 kg of water for prehydrolysis (1 hour at 90° C.).
  2.84 kg of butyl glycol
  9.23 kg of sec.-butanol
  0.04 kg of hydrochinon Solids content: 82.3% by weight.

Deposition bath: 243 g of the refill concentrate were gradually diluted with 18.2 g of triethylamine and 1739 g of distilled water.

MEQ-value: 86.

Solids content: 10% by weight.

The term cyclized rubber as used in this specification is described inter alia in German Patent Nos. 675,567; 705,399; and 706,912 and in Rompps Chemie Lexikon 7th edition, Franckh'sche VerlagsBuchhandlung Stuttgart, page 718.

The term "(meth) acrylic" is intended to comprise "acrylic" and/or "methacrylic." The average molecular weight given is the number average molecular weight approximately ±20% determined with the vapour pressure osmometer.

In the examples the 1,4-cis-polybutadiene with an average molecular weight of 1500 contains about by weight 75% 1,4-cis double-bonds, 24% 1,4-trans-double bonds and 1% vinyl groups.

Table

|  | EXAMPLE 5 | EXAMPLE 6 | EXAMPLE 7 |
|---|---|---|---|
| pH-value | 6.6 | 6.8 | 6.7 |
| Conductivity of bath | 680 $\mu Scm^{-1}$ | 1000 $\mu Scm^{-1}$ | 903 $\mu Scm^{-1}$ |
| MEQ-value | 60 | 88 | 86 |
| Deposition conditions | 2 min., 30° C. | 2 min., 30° C. | 2 min., 30° C. |
| Deposition voltage | 430 volts/25-$\mu m$ | 350 volts/25-$\mu m$ | 370 volts/24-$\mu m$ |
| Firing temperature | 25 min., 175° C. | 25 min., 175° C. | 25 min., 175° C. |
| Konig Pendulum Test (DIN 53 157) | 105 sec. | 59 sec. | 53 sec. |
| Erichsen Deep Drawing Test (DIN 53 156) | 6.1 mm | 6.1 mm | 1.7 mm |
| Salt Spraying Test: (DIN 50 021) Undermoving at the cut | | | |
| 144 h bl. Fe | 3–5 mm | 2–3.5 mm | 4–5 mm |
| 360 h Bo 127 | 2–4 mm | 2–3 mm | 1–3 mm |

What is claimed is:

1. An aqueous coating composition comprising a binder of a modified, water-dilutable olefin polymer oil imide resin having an olefin polymer oil portion in the molecular weight range of from about 500 to about 2500, comprising at least 40% by weight of 1,4-polybutadiene oil, wherein the imide resin has a viscosity of from about 300 to about 1500 m Pas as measured on a 50% solution (weight/weight) in dibutyl glycol at 25° C. and contains from about 2.0 to about 3.5 milliequivalents of carboxyl groups per gram resin and from about 0.3 to about 2.0 milliequivalents of imide groups per gram resin and from about 10 to about 40 milliequivalents of imide groups for each 100 milliequivalents of imide groups and carboxyl groups.

2. The aqueous coating composition of claim 1 comprising said binder and a compatible synthetic resin.

* * * * *

UNITED STATES PATENT AND TRADEMARK OFFICE
CERTIFICATE OF CORRECTION

PATENT NO. : 4,209,598
DATED : June 24, 1980
INVENTOR(S) : Hans-Peter PATZSCHKE

It is certified that error appears in the above—identified patent and that said Letters Patent is hereby corrected as shown below:

Column 8, line 24, after "25µ", insert --m--.

Column 8, line 62, after "25µ", insert --m--.

Column 9, line 26, after "25µ", insert --m--.

Column 12, Claim 1, line 28, before "molecular", insert --average--.

Column 12, Claim 1, line 32, delete "dibuty" and insert --butyl--.

Signed and Sealed this

Eleventh Day of November 1980

[SEAL]

Attest:

SIDNEY A. DIAMOND

Attesting Officer

Commissioner of Patents and Trademar